E. E. RAYBURN.
PULLEY.
APPLICATION FILED AUG. 31, 1920.
1,385,396. Patented July 26, 1921.
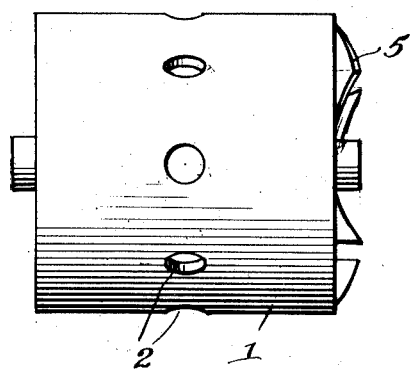
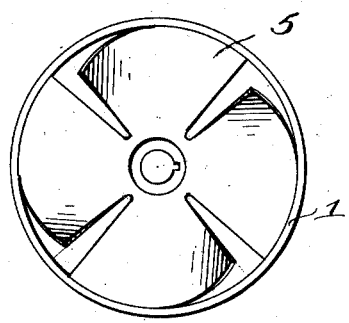
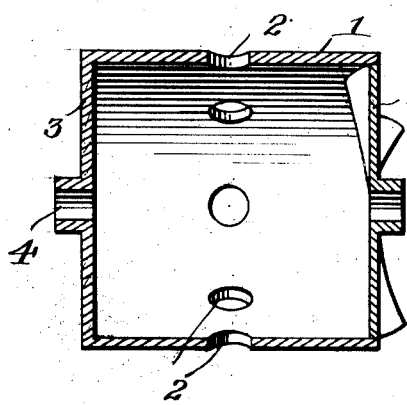
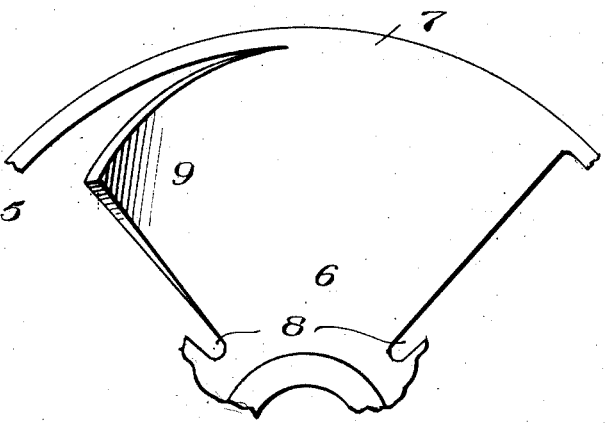
E. E. Rayburn
INVENTOR
BY Victor J. Evans
ATTORNEY

UNITED STATES PATENT OFFICE.

EVERETT E. RAYBURN, OF GREENVIEW, ILLINOIS.

PULLEY.

1,385,396.  Specification of Letters Patent.  Patented July 26, 1921.

Application filed August 31, 1920. Serial No. 407,124.

*To all whom it may concern:*

Be it known that I, EVERETT E. RAYBURN, a citizen of the United States, residing at Greenview, in the county of Menard and State of Illinois, have invented new and useful Improvements in Pulleys, of which the following is a specification.

This invention relates to a pulley construction and has for its primary object a pulley so constructed that the belt will more effectively engage the pulley.

An object of the invention is to provide, in an inexpensive manner, means tending to create a vacuum between the belt and pulley so that the suction will increase the effective grip between the belt and pulley.

A feature of the invention is the novel manner of constructing and arranging the parts so that the pulley may be manufactured at a relatively low cost.

With these and other objects in view the invention will be better understood from the following detailed description taken in connection with the accompanying drawing wherein:

Figure 1 is an elevation of the pulley.

Fig. 2 is a sectional view.

Fig. 3 is an end elevation.

Fig. 4 is a detailed view of a modified form of my invention.

Again referring to the drawing illustrating one of the many forms of my invention the numeral 1 designates a body of the pulley shown provided at spaced points with air holes 2. In the preferred form of my invention one end of the body is closed by the solid plate 3 that is provided with the shaft opening 4. The other end of the body has arranged therein a fan 5 so shaped as to direct air through the opening 2 and expel same from the interior of the pulley thereby, in the rotation of the pulley, tending to create a vacuum between the belt and pulley so that atmospheric pressure upon the belt will increase the latter's effective grip with the pulley.

In the modified form of my invention I have shown the end wall 6 solid with the body 7 and slotted along the lines 8 so that the blades 9 may be bent therefrom thereby materially reducing the cost of manufacture.

From the foregoing description taken in connection with the accompanying drawing it will be apparent that I provide a pulley of simple construction that will materially increase the effective grip of the belt with the pulley while at the same time will not subject the belt to increased wear.

It is, of course, to be understood that the invention may be constructed in various other manners and the parts associated in different relations and, therefore, I do not desire to be limited in any manner except as set forth in the claims hereunto appended.

Having thus described my invention what I claim is:

1. A hollow cylindrical pulley having air holes formed in its periphery and having one side wall shaped into a fan.

2. A pulley having air holes arranged in its peripheral portion, one side wall solid, the other wall slit and bent to a shape of a fan.

3. A pulley comprising a cylindrical body portion having air holes, a solid plate closing one end of the body, and a fan forming the other end of the body.

4. A pulley comprising a cylindrical body portion having one end closed and its other end solid with the body portion and shaped into a fan.

In testimony whereof I affix my signature.

EVERETT E. RAYBURN.